(No Model.) 2 Sheets—Sheet 1.

N. TESLA.
ELECTRO MAGNETIC MOTOR.

No. 382,279. Patented May 1, 1888.

WITNESSES:
Robt. F. Gaylord
Frank B. Murphy

INVENTOR
Nikola Tesla
BY
Duncan, Curtis & Page
ATTORNEYS.

(No Model.) 2 Sheets—Sheet 2.
N. TESLA.
ELECTRO MAGNETIC MOTOR.
No. 382,279. Patented May 1, 1888.
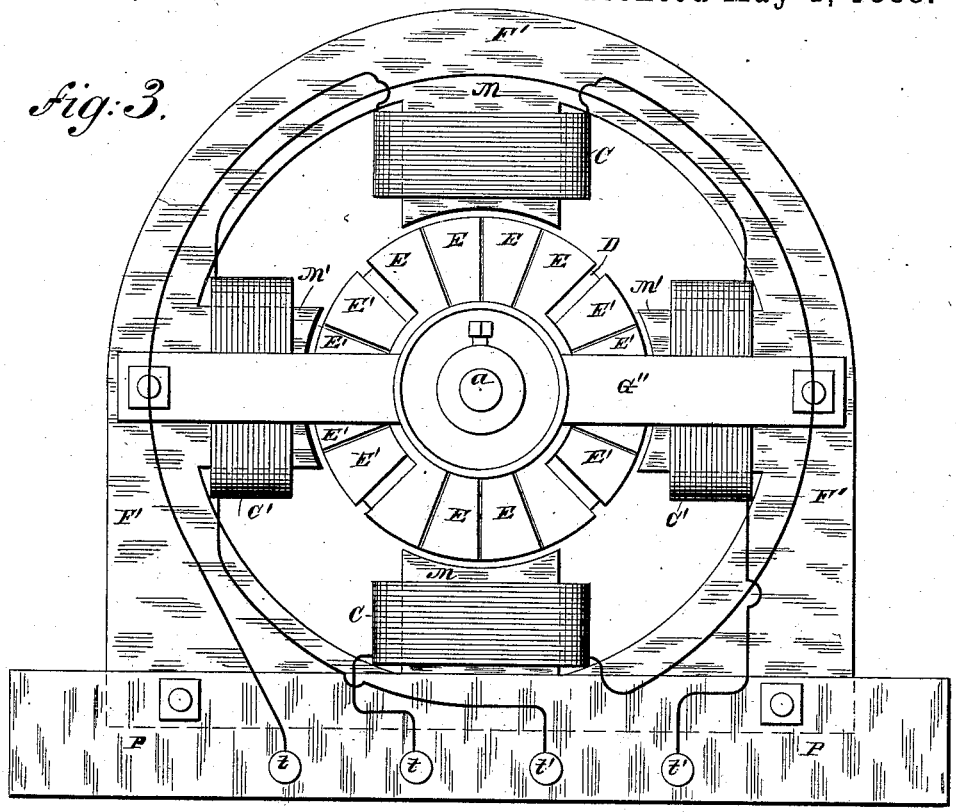
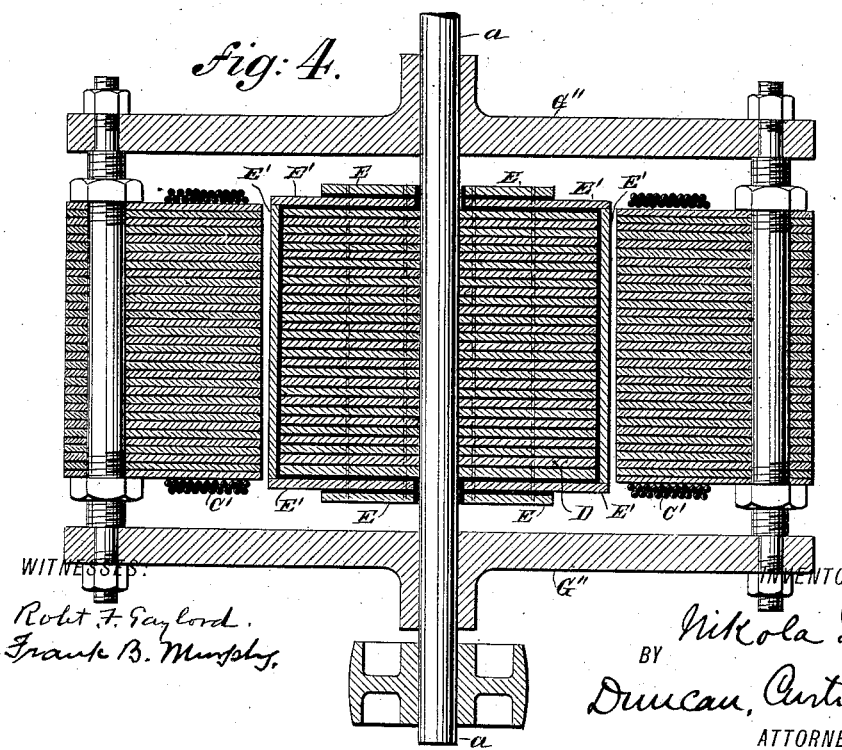
WITNESSES:
Robt. F. Gaylord.
Frank B. Murphy.
INVENTOR,
Nikola Tesla.
BY Duncan, Curtis & Page
ATTORNEYS.

UNITED STATES PATENT OFFICE.

NIKOLA TESLA, OF NEW YORK, N. Y., ASSIGNOR OF ONE-HALF TO CHARLES F. PECK, OF ENGLEWOOD, NEW JERSEY.

ELECTRO-MAGNETIC MOTOR.

SPECIFICATION forming part of Letters Patent No. 382,279, dated May 1, 1888.

Application filed November 30, 1887. Serial No. 256,561. (No model.)

*To all whom it may concern:*

Be it known that I, NIKOLA TESLA, a subject of the Emperor of Austria, from Smiljan, Lika, border country of Austria-Hungary, now residing at New York, in the county and State of New York, have invented certain new and useful Improvements in Electro-Magnetic Motors, of which the following is a specification, reference being had to the drawings accom10 panying and forming a part of the same.

In a former application, filed October 12, 1887, No. 252,132, I have shown and described a mode or plan of operating electric motors by causing a progressive shifting of the poles of one or both of the parts or elements of a motor—that is to say, of either the field magnet or magnets or armature, or both. I accomplish this by constructing a motor with two or more independent energizing-circuits, on the field-magnets, for example, and I connect these up with corresponding induced or generating circuits in an alternating-current generator, so that alternating currents are caused to traverse the motor-circuits. By so doing the poles of the field-magnet of the motor are progressively shifted, and by their attraction upon a rotary armature set up a rotation in the latter in the direction of the movement of the poles. In this case, however, the rotation is produced and maintained by the direct attraction of the magnetic elements of the motor. I have discovered that advantageous results may be secured in this system by utilizing the shifting of the poles primarily to set up currents in a closed conductor located within the influence of the field of the motor, so that the rotation may result from the reaction of such currents upon the field.

To illustrate more fully the nature of the in40 vention I refer to the accompanying drawings.

Figure 1:
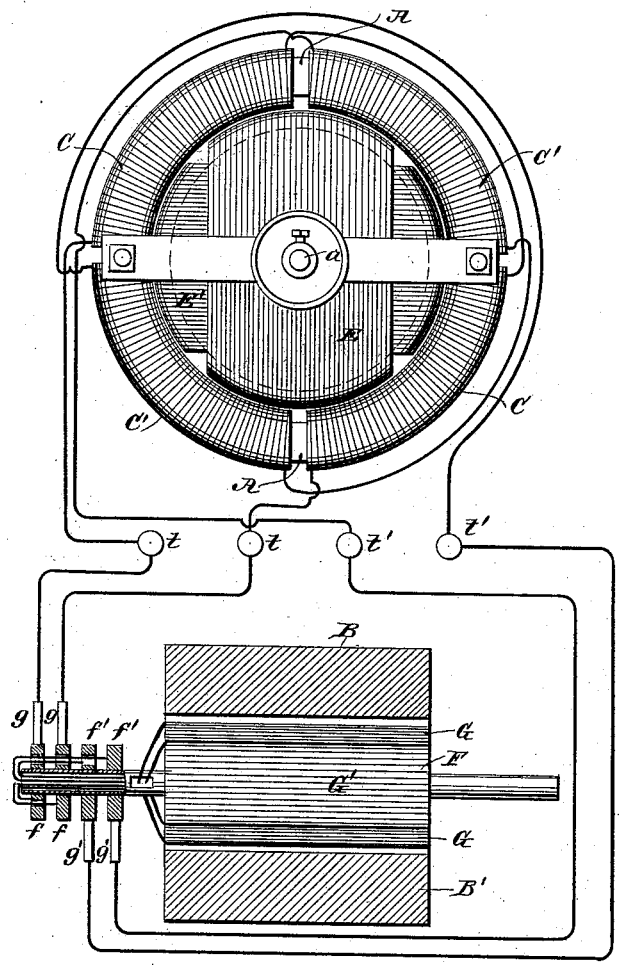
Figure 2:
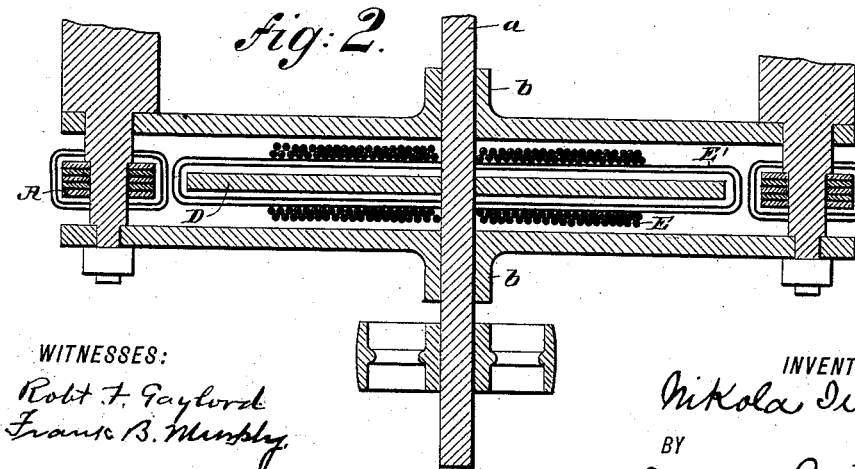

Figure 1 represents in side elevation the operative parts or elements of a motor embodying the principles of my invention, and in section the generator for operating the same. Fig. 2 is a horizontal central section of the motor in Fig. 1, the circuits being shown partly in diagram. Fig. 3 is a modified form of motor in side elevation. Fig. 4 is a central horizontal cross-section of Fig. 3.

In Figs. 1 and 2, A is an annular core of soft iron, preferably laminated or formed of insulated sections, so as to be susceptible to rapid variations of magnetism. This core is wound with four coils, C C C' C', the diametrically-opposite coils being connected in the same circuit, and the two free ends of each pair being brought to the terminals $t$ and $t'$, respectively, as shown. Within this annular field-magnet A is mounted a soft-iron cylinder or disk, D, on an axis, $a$, in bearings $b\ b$, properly supported by the frame-work of the machine. The disk carries two coils, E E', of insulated wire, wound at right angles to one another, and having their respective ends joined, so that each coil forms a separate closed circuit.

In illustration of the action or mode of operation of this apparatus, let it be assumed that the annular field-magnet A is permanently magnetized, so as to present two free poles diametrically opposite. If suitable mechanical provision be now made for rotating the field-magnet around the disk, the apparatus exemplifies the conditions of an ordinary magneto-generator, and currents would be set up in the coils or closed conductors E E' on the disk D. Evidently these currents would be the most powerful at or near the points of the greatest density of the lines of force, and they would, as in all similar cases, tend, at least theoretically, to establish magnetic poles in the disk D at right angles to those in the annular field-magnet A. As a result of the well-known reaction of these polarities upon each other, a more or less powerful tendency in the disk to rotate in the same direction as that of the field-magnet would be established. If, on the other hand, the ring or annular field-magnet A be held stationary and its magnetic poles progressively shifted by passing through its coils C C' properly-alternated currents, it is obvious that similar results will follow, for the passage of the currents causing the shifting or whirling of the poles of the field-magnet A induces currents in the closed circuits of the armature-coils E E', with the result of setting up a rotation of the disk D in the same direction of such shifting. Inasmuch as the currents are always induced or generated in the coils E E' in the same manner, the poles of the disk or cylinder follow continuously the poles of the annular field-magnet, maintaining, at least theoretically, the same relative positions. This results in an even and perfect action of the apparatus.

In order that the system as a whole may be better understood, I shall now describe the mode or plan devised by me for producing the currents that effect the progressive shifting of the poles of the motor.

In Fig. 1, B B' are the poles or pole-pieces of an alternating-current generator. They are permanently magnetized and of opposite polarity. F is a cylindrical or other armature containing the independent coils G G'. These coils are wound at right angles, so that while one is crossing the strongest portion of the field of force the other is at the neutral point. The coils G G' terminate in the two pairs of insulated collecting-rings $f$ and $f'$, upon which bear the brushes $g$ $g'$. Four wires connect the motor-terminals $t$ and $t'$ with the brushes $g$ and $g'$, respectively. When the generator is rotated, the coil G will at the certain point shown in the drawings be generating its maximum current, while coil G' is neutral. Let it be assumed that this current is conveyed from the rings $f$ $f$ to the terminals $t$ $t$ and through the coils C C. Its effect will be to establish poles in the ring midway between the two coils. By the further rotation of the generator the coil G' is brought within the influence of the field and begins to produce a current, which grows stronger as the said coil approaches the maximum points of the field, while the current produced in the coil G diminishes as the said coil recedes from those points. The current from the coil G', being conveyed to the terminals $t'$ $t'$ and through coils C' C', has a tendency to establish poles at right angles to those set up by the coils C C; but owing to the greater effect of the current in coils C C the result is merely to advance the poles from the position in which they would remain if due to the magnetizing influence of coils C C alone. This progression continues for a quarter-revolution until coil G G becomes neutral and coil G' G' produces its maximum current. The action described is then repeated, the poles having been shifted through one-half of the field, or a half-revolution. The second half-revolution is accomplished in a similar way, the same polarity being maintained in the shifting poles by the movement of the generator-coils alternately through fields of opposite polarity.

The same principle of operation may be applied to motors of various forms, and I have shown one of such modified forms in Figs. 3 and 4 of the drawings. In these figures, M M' are field-magnets secured to or forming part of a frame, F', mounted on a base, P. These magnets should be laminated or composed of a number of electrically-insulated magnetic sections, to prevent the circulation of induced currents and to render them capable of rapid magnetic changes. These magnetic cores or poles are wound with insulated coils C C', the diametrically-opposite coils being connected together in series and their free ends brought to terminals $t$ $t'$, respectively. Between the poles there is mounted, in bearings in the cross-pieces G'', a cylindrical iron core, D, which, in order to prevent the formation of eddying currents, and the loss consequent thereon, is subdivided in the usual way. Insulated conductors or coils are applied to the cylinder D longitudinally, and for these I may employ copper plates E E', which are secured to the sides and ends of the cylindrical core in well-known ways. These plates or conductors may form one or preferably several independent circuits around the core. In the drawings two of such circuits are shown, formed respectively by the conductors E and E', which are insulated from each other. It is advantageous also to slot these plates longitudinally, to prevent the formation of eddy currents and waste of energy.

From what has now been given the operation of this apparatus will be readily understood. To the binding-posts $t$ $t'$ are connected the proper circuits from the generator to cause a progressive shifting of the resultant magnetic poles produced by the magnets M upon the armature. Thus currents are induced in the closed circuits on the core, which, energizing the core strongly, maintain a powerful attraction between the same and the field, which causes a rotation of the armature in the direction in which the resultant poles are shifted.

The particular advantage of the construction illustrated in Figs. 3 and 4 is that a concentrated and powerful field is obtained and a remarkably powerful tendency to rotation in the armature secured. The same results may be obtained in the form illustrated in Figs. 1 and 2, however, by forming polar projections on the field and armature cores.

When these motors are not loaded, but running free, the rotation of the armature is nearly synchronous with the rotation of the poles of the field, and under these circumstances very little current is perceptible in the coils E E'; but if a load is added the speed tends to diminish and the currents in coils E E' are augmented, so that the rotary effort is increased proportionately.

Obviously the principle of this invention is capable of many modified applications, most of which follow as a matter of course from the constructions described. For instance, the armature-coils, or those in which the currents are set up by induction, may be held stationary and the alternating currents from the generator conducted through the rotating inducing or field coils by means of suitable sliding contacts. It is also apparent that the induced coils may be movable and the magnetic parts of the motor stationary; but I have illustrated these modifications fully in the application to which reference has herein been made.

In the case of motors wound with independent field and armature circuits and operated by shifting their poles, as described in my said prior application, I may by short-circuiting the armature-coils apply the present invention in order to obtain greater power on starting.

An advantage and characteristic feature of motors constructed and operated in accordance with this invention is their capability of almost instantaneous reversal by a reversal of one of the energizing-currents from the generator. This will be understood from a consideration of the working conditions. Assuming the armature to be rotating in a certain direction following the movement of the shifting poles, then reverse the direction of the shifting, which may be done by reversing the connections of one of the two energizing-circuits. If it be borne in mind that in a dynamo-electric machine the energy developed is very nearly proportionate to the cube of the speed, it is evident that at such moment an extraordinary power is brought to play in reversing the motor. In addition to this the resistance of the motor is very greatly reduced at the moment of reversal, so that a much greater amount of current passes through the energizing-circuits.

The phenomenon alluded to—viz., the variation of the resistance of the motor apparently like that in ordinary motors—I attribute to the variation in the amount of self-induction in the primary or energizing circuits.

These motors present numerous advantages, chief among which are their simplicity, reliability, economy in construction and maintenance, and their easy and dangerless management. As no commutators are required on either the generators or the motors, the system is capable of a very perfect action and involves but little loss.

I do not claim herein the mode or plan of producing currents in closed conductors in a magnetic field which is herein disclosed, except in its application to this particular purpose; but

What I claim is—

1. The combination, with a motor containing independent inducing or energizing circuits and closed induced circuits, of an alternating-current generator having induced or generating circuits corresponding to and connected with the energizing-circuits of the motor, as set forth.

2. An electro-magnetic motor having its field-magnets wound with independent coils and its armature with independent closed coils, in combination with a source of alternating currents connected to the field-coils and capable of progressively shifting the poles of the field-magnet, as set forth.

3. A motor constructed with an annular field-magnet wound with independent coils and a cylindrical or disk armature wound with closed coils, in combination with a source of alternating currents connected with the field-magnet coils and acting to progressively shift or rotate the poles of the field, as herein set forth.

NIKOLA TESLA.

Witnesses:
FRANK B. MURPHY,
FRANK E. HARTLEY.